(12) United States Patent
Feyereisen et al.

(10) Patent No.: US 9,105,115 B2
(45) Date of Patent: Aug. 11, 2015

(54) DISPLAY SYSTEMS AND METHODS FOR DISPLAYING ENHANCED VISION AND SYNTHETIC IMAGES

(75) Inventors: Thea L. Feyereisen, Hudson, WI (US); John G. Suddreth, Cave Creek, AZ (US); Troy Nichols, Peoria, AZ (US)

(73) Assignee: HONEYWELL INTERNATIONAL INC., Morristown, NJ (US)

( * ) Notice: Subject to any disclaimer, the term of this patent is extended or adjusted under 35 U.S.C. 154(b) by 1103 days.

(21) Appl. No.: 12/725,320

(22) Filed: Mar. 16, 2010

(65) Prior Publication Data
US 2011/0227944 A1    Sep. 22, 2011

(51) Int. Cl.
G09G 5/00    (2006.01)
G06T 11/00    (2006.01)

(52) U.S. Cl.
CPC ...................................... G06T 11/00 (2013.01)

(58) Field of Classification Search
None
See application file for complete search history.

(56) References Cited

U.S. PATENT DOCUMENTS

| | | | |
|---|---|---|---|
| 3,938,386 A * | 2/1976 | Comfort et al. | 374/107 |
| 5,414,439 A | 5/1995 | Groves et al. | |
| 5,488,674 A * | 1/1996 | Burt et al. | 382/284 |
| 5,704,367 A * | 1/1998 | Ishikawa et al. | 600/473 |
| 6,166,744 A * | 12/2000 | Jaszlics et al. | 345/629 |
| 6,212,286 B1 * | 4/2001 | Rott et al. | 382/100 |
| 6,496,593 B1 * | 12/2002 | Krone et al. | 382/104 |
| 6,633,304 B2 | 10/2003 | Anabuki et al. | |
| 6,759,949 B2 | 7/2004 | Miyahara | |
| 6,934,422 B2 | 8/2005 | Hamza | |
| 7,110,616 B2 | 9/2006 | Ditt et al. | |
| 7,474,798 B2 | 1/2009 | Seger et al. | |
| 7,479,967 B2 * | 1/2009 | Bachelder et al. | 345/592 |
| 7,619,556 B1 * | 11/2009 | McCusker | 342/33 |
| 7,619,626 B2 * | 11/2009 | Bernier | 345/427 |
| 7,679,046 B1 * | 3/2010 | Benson et al. | 250/252.1 |
| 2002/0128797 A1 * | 9/2002 | Sun | 702/172 |
| 2002/0185600 A1 * | 12/2002 | Kerr | 250/330 |
| 2003/0218674 A1 | 11/2003 | Zhao et al. | |
| 2005/0232512 A1 | 10/2005 | Luk et al. | |
| 2005/0238253 A1 * | 10/2005 | Behrenbruch et al. | 382/294 |
| 2006/0289768 A1 * | 12/2006 | Vallese et al. | 250/353 |
| 2008/0158256 A1 | 7/2008 | Russell et al. | |

(Continued)

FOREIGN PATENT DOCUMENTS

EP    0599345 A2    1/1994

OTHER PUBLICATIONS

Habib et al., Linear Features for Semi-Automatic Registration and Change Detection of Multi-Source Imagery, 0-7803-9050-4/05, 2005 IEEE, pp. 2117-2120.

(Continued)

Primary Examiner — David H Chu
(74) Attorney, Agent, or Firm — Ingrassia Fisher & Lorenz, P.C.

(57) ABSTRACT

A vehicle display system displays enhanced vision (EV) and captured images, for example synthetic vision (SV) images, to an operator of a vehicle. The display system includes an EV vision system for generating EV images, an SV database containing information regarding terrain and objects of interest for a travel path of a vehicle, an SV system for generating SV images based on travel of the vehicle and information from the SV database, a processor for filtering the EV images and merging the filtered EV image with the SV image, and a display for displaying the merged SV and filtered EV images.

20 Claims, 7 Drawing Sheets

(56) References Cited

U.S. PATENT DOCUMENTS

| | | | |
|---|---|---|---|
| 2008/0180351 A1* | 7/2008 | He | 345/1.1 |
| 2009/0002220 A1 | 1/2009 | Lovberg et al. | |
| 2009/0060272 A1 | 3/2009 | Reinpoldt, III | |
| 2009/0138138 A1 | 5/2009 | Ferren et al. | |
| 2009/0274388 A1 | 11/2009 | Miller et al. | |
| 2010/0127171 A1* | 5/2010 | Jonsson et al. | 250/330 |
| 2011/0234805 A1* | 9/2011 | Matsuda et al. | 348/148 |

OTHER PUBLICATIONS

Daneshvar et al., A Hybrid Algorithm for Medical Image Registration, Proceedings of the 2005 IEEE, Engineering in Medicine and Biology 27th Annual Conference, Shanghai, China, Sep. 1-4, 2005, pp. 3272-3275.

Bentoutou et al., An Automatic Image Registration for Applications in Remote Sensing, IEEE Transactions on Geoscience and Remote Sensing, vol. 43, No. 9, Sep. 2005, pp. 2127-2137.

Dai X., A Feature-Based Image Registration Algorithm Using Improved Chain-Code Representation Combined With Invariant Moments, IEEE Transactions on Geoscience and Remote Sensing, vol. 37, No. 5, Sep. 1999, pp. 2351-2362.

Goshtasby et al., A Region-Based Approach to Digital Image Registration With Subpixel Accuracy, IEEE Transactions on Geoscience and Remote Sensing, vol. GE-24, No. 3, May 1986, pp. 390-399.

Flusser et al., A Moment-Based Approach to Registration of Images with Affine Geometric Distortion, 8110 IEEE Transactions on Geoscience and Remote Sensing, 32 Mar. 1994, No. 2, New York, US, No. 2, Mar. 1994, pp. 382-387.

EP Search Report, 07111109.0 dated Feb. 18, 2008.

Hamza R. M., et al.; Fusion of Sensor Data and Synthetic Data to Form an Integrated Image, U.S. Appl. No. 11/475,492, filed with the USPTO on Jun. 27, 2006.

Besl, P. J. et al.; A Method for Registration of 3-D Shapes, IEEE Transactions on Pattern Analysis and Machine Intelligence, vol. 14, No. 2, Feb. 1992.

\* cited by examiner

DISPLAY SYSTEMS AND METHODS FOR DISPLAYING ENHANCED VISION AND SYNTHETIC IMAGES

TECHNICAL FIELD

The exemplary embodiments described herein generally relate to display systems and more particularly to a display system and method for displaying both enhanced vision system and synthetic vision system images.

BACKGROUND

Figure 1:
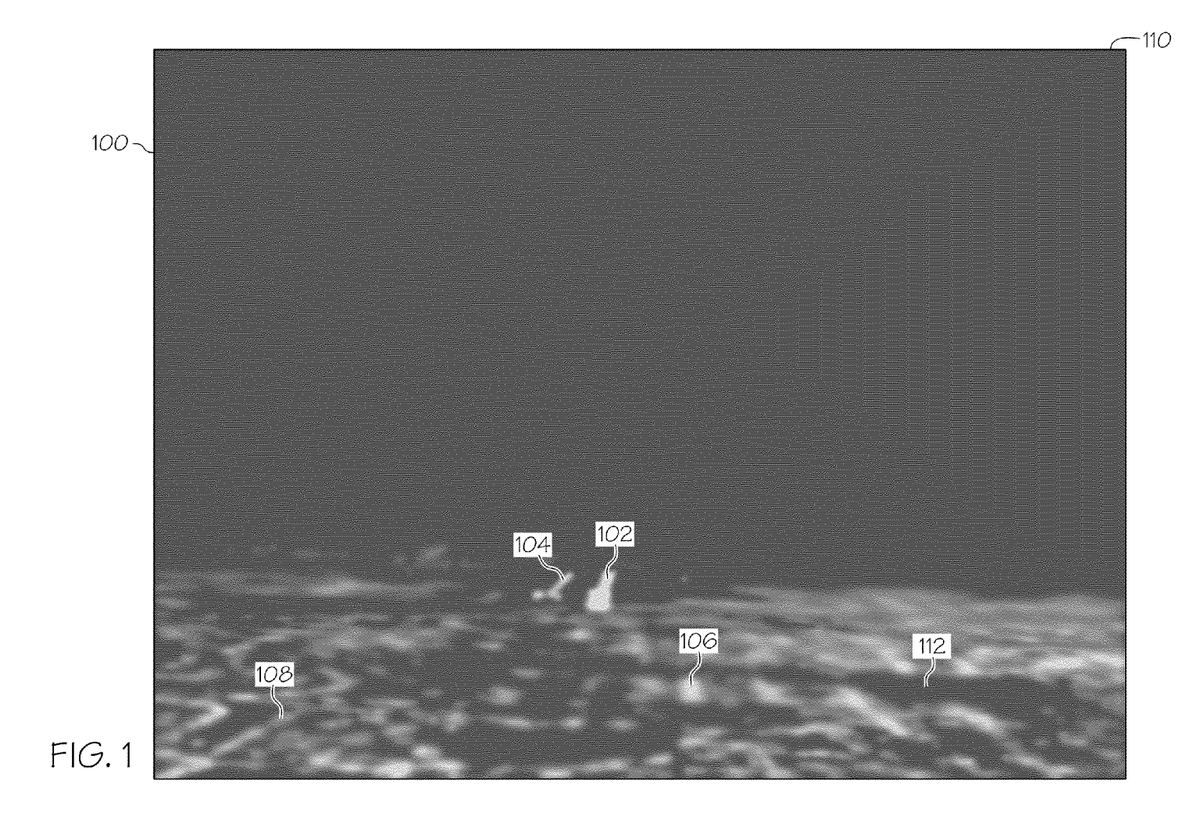
FIG. 1 is a display of a known enhanced vision image.

Many vehicles, such as aircraft, include display systems to convey flight path and/or flight management information. One type of display system is an enhanced vision (EV) system. An EV system uses an infrared (IR) and/or millimeter wave (MMW) video camera to sense thermal signatures of objects and to render images based on the sensed thermal signatures on a display. Although the EV system, with the ability to see in reduced visibility conditions, displays particular features/objects which may be overwhelmed by surrounding or adjacent image areas having similar thermal signatures. FIG. 1 is an EV image 100 showing a runway 102, a taxiway 104, and various other objects around the airport, such as buildings 106 and roads 108. FIG. 1 also includes dark areas, providing little thermal output, such as the sky 110 and terrain 112. Although image processing can improve image quality, the images presented to the vehicle operator still may be insufficient.

Figure 2:
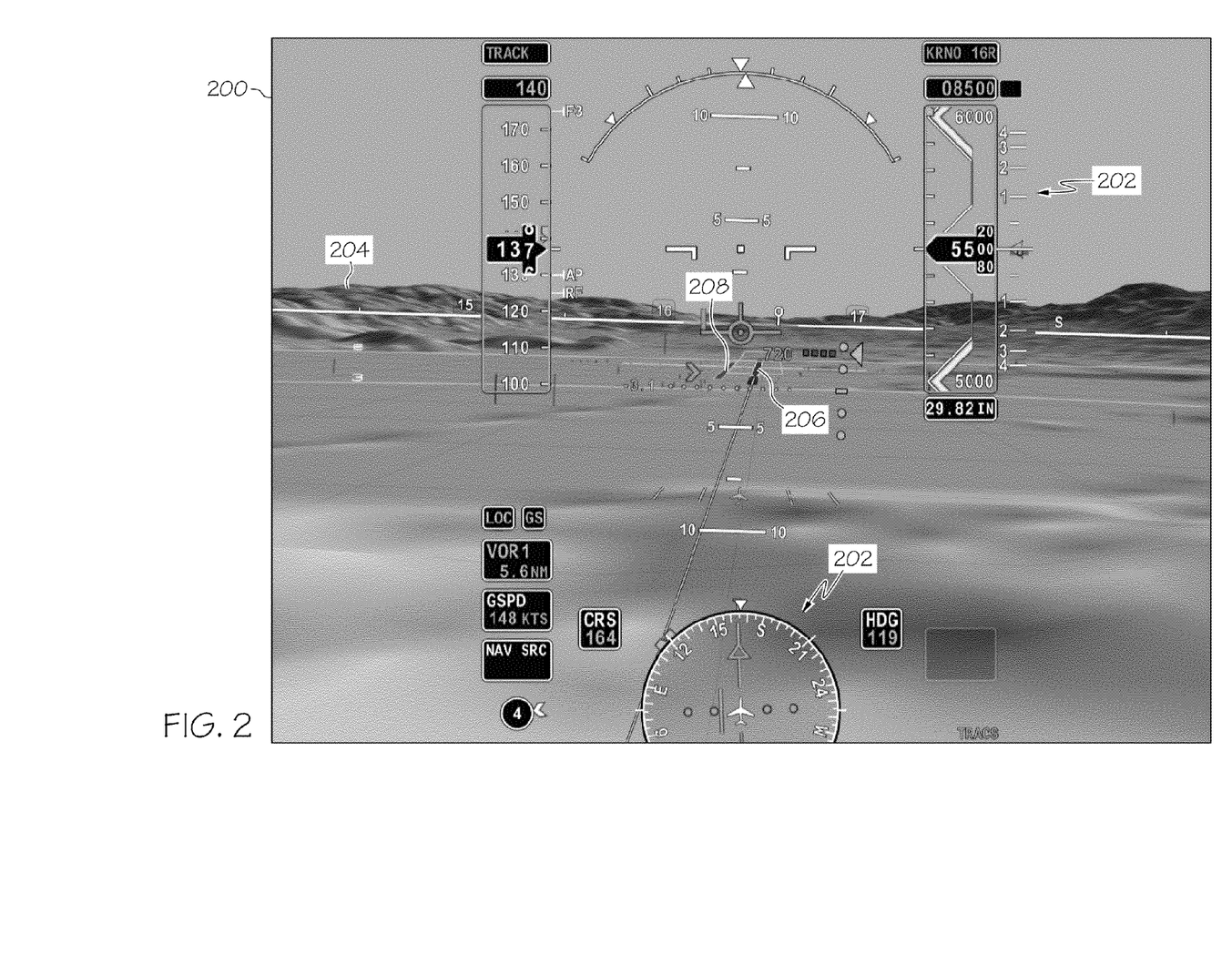
FIG. 2 is a display of a known synthetic vision image.

Another type of display system is a synthetic vision (SV) system. An SV system operates by rendering an image based on pre-stored database information. For example, referring to FIG. 2, an image 200 created from the pre-stored database information may include flight management data 202, e.g., heading, altitude, and speed, superimposed on a synthetic rendering of terrain 204 and objects such as a runway 206 and a taxiway 208, some of which may be of a range for detection by an EV system or not clearly shown in an EV images. Thus, SV images can provide the vehicle operator with an effective interface for vehicle control. SV image integrity, however, is limited by the integrity of the information pre-stored in the database. Accordingly, incomplete and/or outdated database information can result in SV images of limited value.

Some display systems display both an SV image and an EV image display. For example, as a fused (merged) image (such as overlaying an EV image onto an SV image) or as a side-by-side display. The images may be indexed at the time of camera installation, e.g., by aligning an EV image sensor to ensure that the sensor and the SV view are indexed. Such a process may be periodically repeated during normal course of maintenance to assure proper alignment. Although such an overlaid "enhanced synthetic vision system" display may be useful, the display can be confusing, noisy, and difficult to interpret. For example, pixel averaging or alpha blending between SV and EV images can result with views being obscured with noisy or non-useful information, making it difficult for the pilot to interpret the information encoded on the display.

Figure 3:
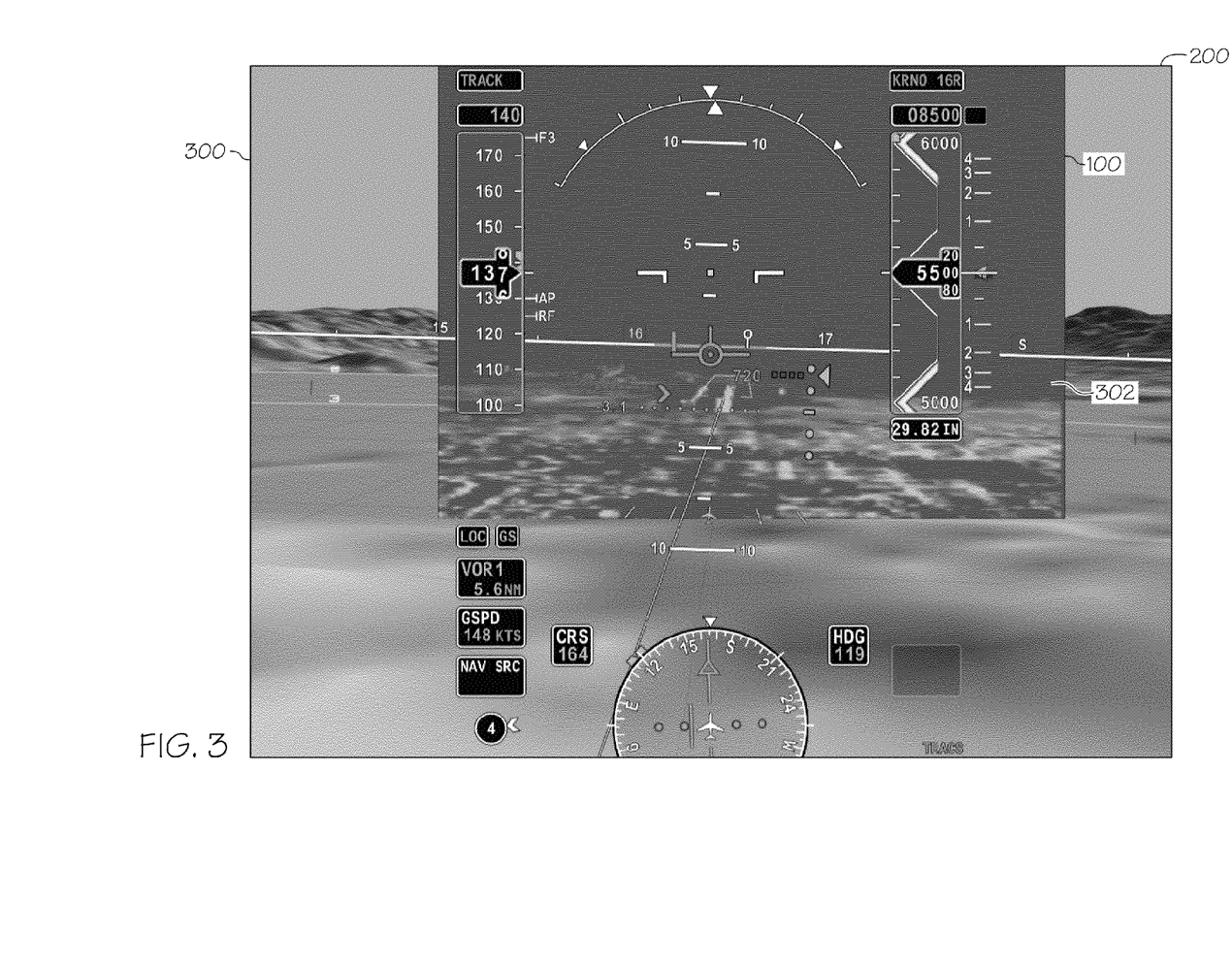
FIG. 3 is a display of known merged EV and SV images.

Referring to FIG. 3, the EV image 100 and the SV image 200 are merged into one image 300. However, the merged image 300 is difficult to interpret. The merged image 300 includes portions that are dark, for example, the black area 302, making it difficult to discern what portions of the merged image are provided by the EV image 100 and the SV image 200. Furthermore, the dark portion 302 may prevent the viewing of a portion of the SV image 200.

Accordingly, it is desirable to provide an apparatus and method for displaying SV and EV images that are relatively easy to interpret and that differentiates between the SV image and the EV image. Furthermore, other desirable features and characteristics of exemplary embodiments will become apparent from the subsequent detailed description and the appended claims, taken in conjunction with the accompanying drawings and the foregoing technical field and background.

BRIEF SUMMARY

Display systems and methods for displaying enhanced vision and synthetic vision images are provided.

In an embodiment, by way of example only, a display system includes an enhanced vision system configured for generating enhanced vision images, an electronic vision system configured for generating captured images, a processor configured to filter the enhanced vision image to produce filtered enhanced vision images and merge the filtered enhanced vision images and the captured images to provide filtered merged images, and a display configured to display the filtered merged images.

In another embodiment, by way of example only, an aircraft display system includes an enhanced vision system configured for generating enhanced vision images, a synthetic vision database containing information regarding terrain for a flight path of the aircraft, a synthetic vision system configured to obtain information from the synthetic vision database for generating synthetic vision images based on flight conditions of the aircraft, a processor configured to filter the enhanced vision image to produce a filtered enhanced vision image and merge the filtered enhanced vision image and the synthetic vision image for providing a filtered merged image, and a display configured to display the filtered merged image.

In still another embodiment, by way of an example only, a method for displaying enhanced vision and captured images to an operator of a vehicle comprises generating enhanced vision images, generating the captured images, filtering the enhanced vision images to produce filtered enhanced vision images, merging the captured images and the filtered enhanced vision images to provide merged images, and displaying the merged images.

BRIEF DESCRIPTION OF THE DRAWINGS

The exemplary embodiments will hereinafter be described in conjunction with the following drawing figures, wherein like numerals denote like elements.

DETAILED DESCRIPTION

The following detailed description is merely exemplary in nature and is not intended to limit the application and uses.

Furthermore, there is no intention to be bound by any theory presented in the preceding technical field, background, brief summary, or the following detailed description.

A vehicle display system and method are provided for displaying enhanced vision (EV) and captured images to an operator of a vehicle. The system is configured to operate by filtering the EV image by removing portions of the image having an undesired signal, for example, black and dark gray, and merging the filtered EV images with the captured images. The captured images may then be viewed more clearly with the superimposed EV images having the undesired signal portions removed.

Figure 4:
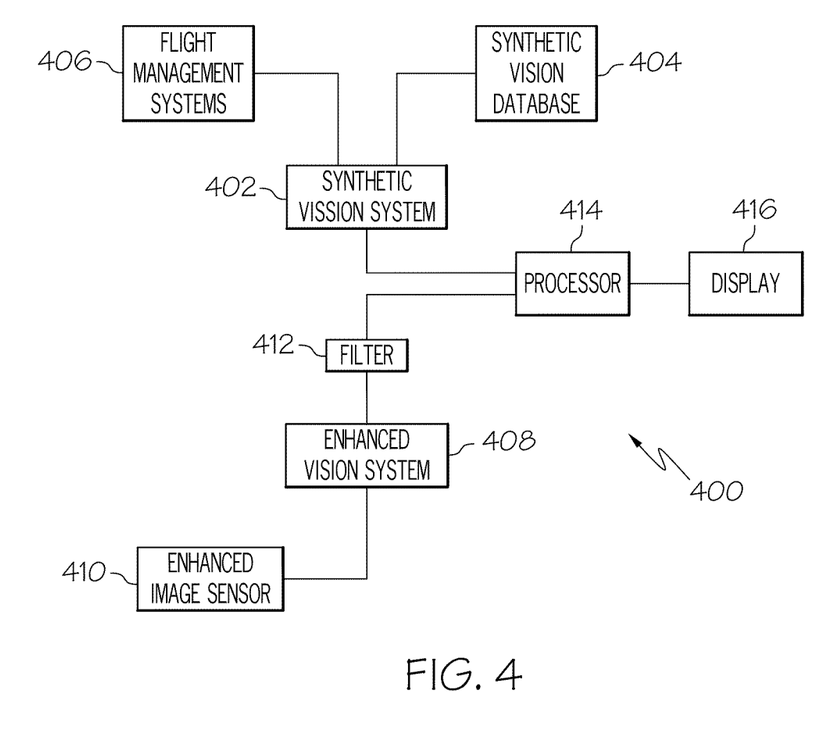
FIG. 4 is a block diagram of a vehicle display system for generating SV and EV display images in accordance with an exemplary embodiment.

Although embodiments described herein are specific to aircraft display systems, it should be recognized that principles of the inventive subject matter may be applied to other vehicle display systems. FIG. 4 is a block diagram of an exemplary vehicle display system 400 for generating captured images and EV display images. Furthermore, it should be understood that while the captured images are generally described herein as synthetic vision (SV) images, other types of images, such as a real time video taken by an onboard camera could also be used. The vehicle display system 400 is configured to display enhanced images to an operator. As illustrated in FIG. 4, the vehicle display system 400 includes an SV system 402, an SV database 404, flight management systems 406, an EV system 408, EV image sensor(s) 410, a filter 412, a processor 414, and a display 416. Although various block diagram elements shown in FIG. 4 are illustrated as discrete elements, this illustration is for use and explanation, and it should be recognized that certain elements may be combined in one or more physical devices, e.g., one or more microprocessor(s) with associated software. For example, the filter 412 may be incorporated within the processor 414.

According to an exemplary embodiment, the SV system 402 is configured to render an image based on pre-stored database information. The SV system 402 includes a processor (not shown) that communicates with the SV database 404 and the flight management system 406. The SV database 404 includes data related to, for example, terrain, objects, obstructions, and navigation information for output to the display 416. A flight management system 406 provides data such as vehicle positioning, heading, attitude, and a flight plan to the SV system 402.

The EV system 408 includes a processor (not shown) that generates an image for display on the display 416 based on the output of one or more of the EV image sensors 410, e.g., infrared and/or millimeter wave video cameras.

The processor 404 is in communication with the SV system 402 and the EV system. The processor 404 may be implemented or realized with a general purpose processor, a content addressable memory, a digital signal processor, an application specific integrated circuit, a field programmable gate array, any suitable programmable logic device, discrete gate or transistor logic, discrete hardware components, or any combination designed to perform the functions described herein. A processor device may be realized as a microprocessor, a controller, a microcontroller, or a state machine. Moreover, a processor device may be implemented as a combination of computing devices, e.g., a combination of a digital signal processor and a microprocessor, a plurality of microprocessors, one or more microprocessors in conjunction with a digital signal processor core, or any other such configuration.

The filtering or removal of undesired portions of the EV images may be triggered by the undesired portions not satisfying a determined threshold range. For example, it may be desired to remove dark areas (those taken by an infrared camera and having a low intensity value), such as terrain or sky, from the EV images. Those dark portions of the EV image not reaching the threshold of a certain intensity would be removed. Another example might be to remove the dark sky and dark terrain, but displaying clouds having an intensity between the terrain and sky, wherein the threshold range for removal may be bifurcated. Yet another example might include the removal of bright objects such as ground clutter.

In the embodiment of the FIGS., the filtering of the low intensity portions 110, 112 of the image 100 by the filter 412 is preferably accomplished by software stored in a memory (not shown) communicating with the filter 412.

The display 416 is configured to provide the enhanced images to the operator. In accordance with an exemplary embodiment, the display 416 may be implemented using any one of numerous known displays suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display 416 may additionally be implemented as a panel mounted display, a HUD (head-up display) projection, or any one of numerous known technologies. It is additionally noted that the display 416 may be configured as any one of numerous types of aircraft flight deck displays. For example, it may be configured as a multi-function display, a horizontal situation indicator, or a vertical situation indicator. In the depicted embodiment, however, the display 416 is configured as a primary flight display (PFD).

The display 416, as noted above, in response to display commands supplied from the processor 404, selectively renders various textual, graphic, and/or iconic information, and thereby supply visual feedback to the operator. It will be appreciated that the display 416 may be implemented using any one of numerous known displays suitable for rendering textual, graphic, and/or iconic information in a format viewable by the operator. Non-limiting examples of such displays include various cathode ray tube (CRT) displays, and various flat panel displays such as various types of LCD (liquid crystal display) and TFT (thin film transistor) displays. The display 416 may additionally be implemented as a panel mounted display, a HUD (head-up display) projection, or any one of numerous known technologies. It is additionally noted that the display 416 may be configured as any one of numerous types of aircraft flight deck displays. For example, it may be configured as a multi-function display, a horizontal situation indicator, or a vertical situation indicator. In the depicted embodiment, however, the display 416 is configured as a primary flight display (PFD).

Figure 5:
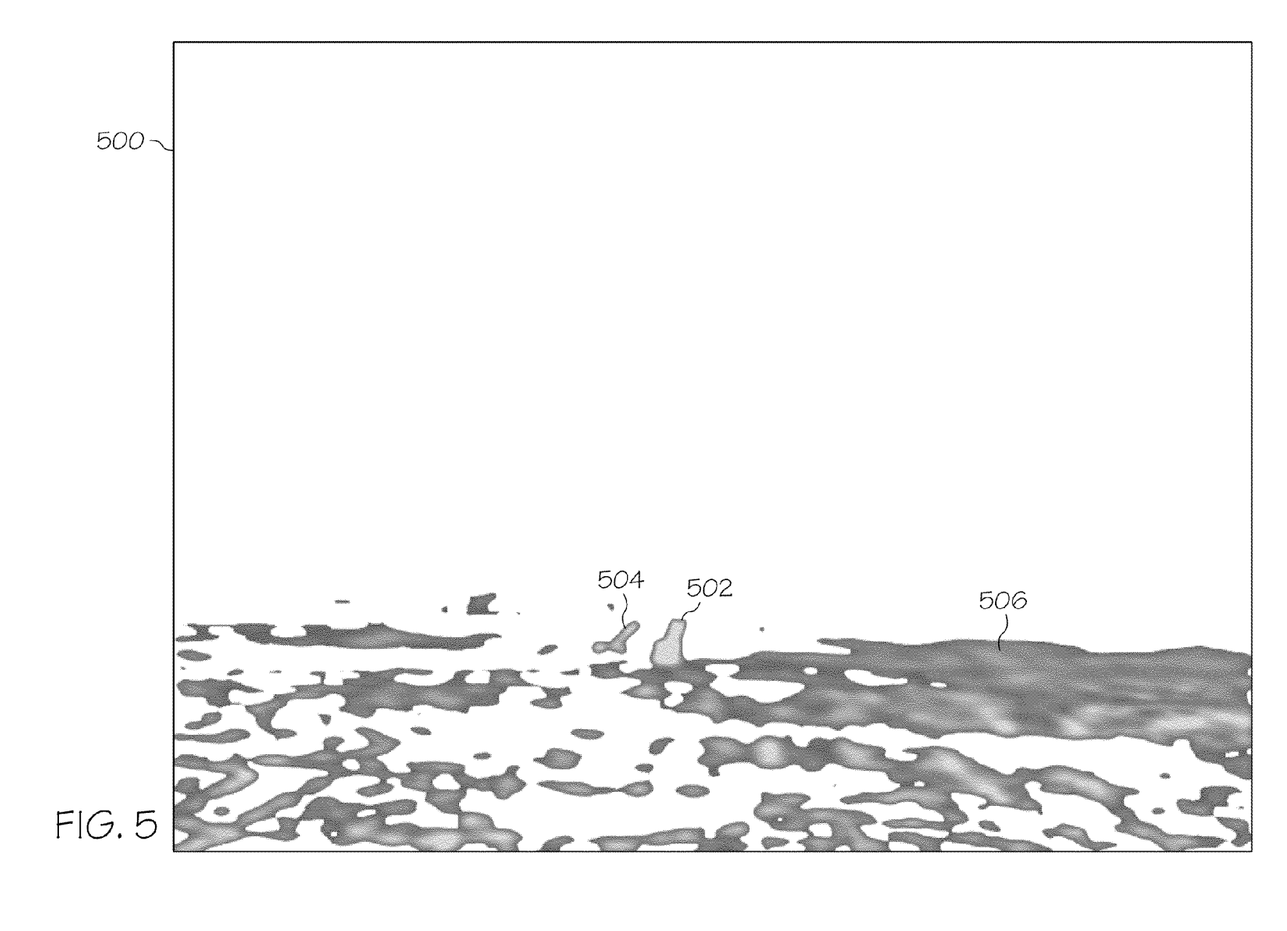
FIG. 5 is a filtered EV image in accordance with an exemplary embodiment.

Referring to FIG. 5, a filtered EV image 500 is shown in which the dark areas 110, 112 of the EV image 100 of FIG. 1 have been removed from the image 500 by filtering, or removing, portions of the image 100 having an intensity below a threshold. The intensity is determined, for example, by the thermal intensity received by the enhanced image sensor 410. The threshold may be predetermined and set in the filter 412 prior to use. Alternatively, the threshold may be adjustable by the operator during use. The filtered EV image 500 includes a runway 502, a taxiway 504, and portions of the terrain 506.

Figure 6:
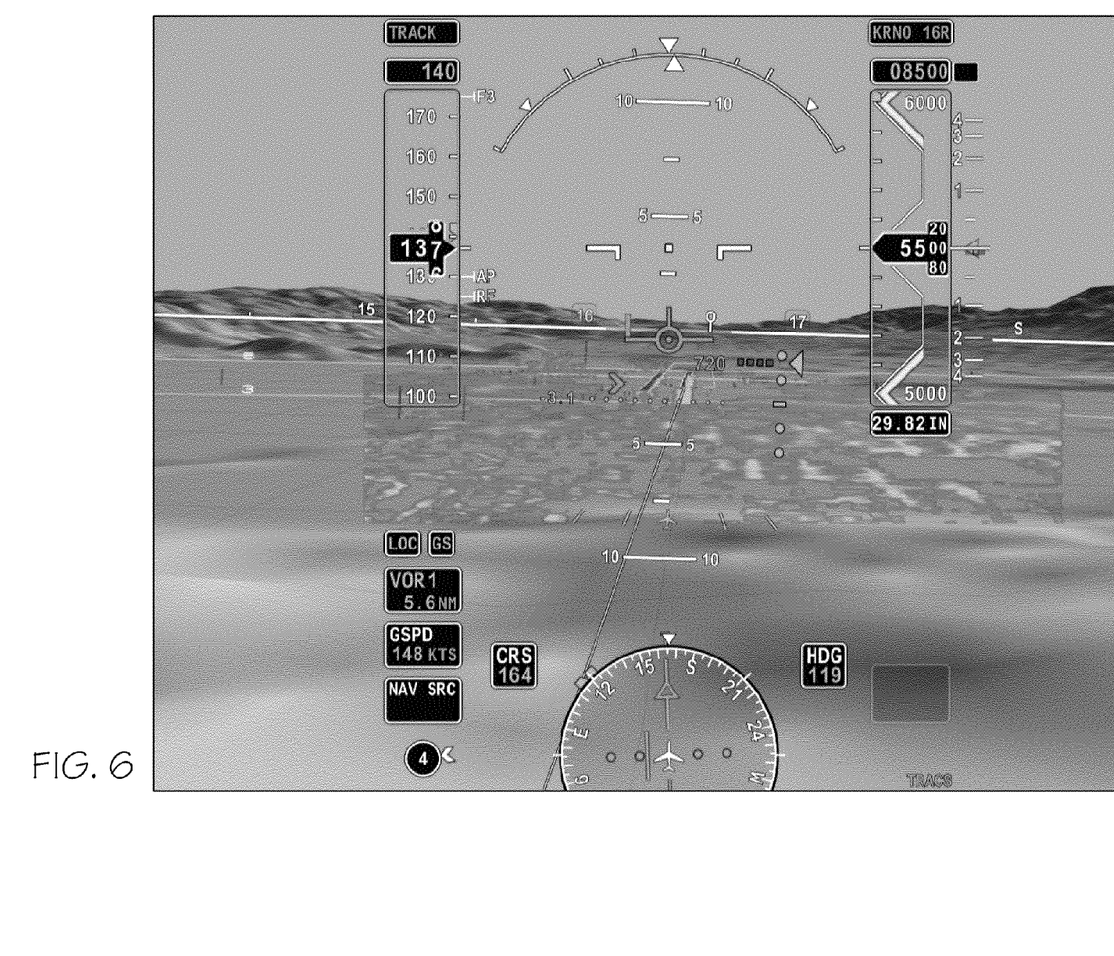
FIG. 6 is a merged image of an SV image and a filtered EV image that may be presented on a display, in accordance with an exemplary embodiment.

FIG. 6 is a filtered merged image 600 that may be provided by the display 616 (FIG. 4) in accordance with an exemplary embodiment. The merged image 600 includes the filtered EV image 500 (FIG. 5), filtered to remove black and darker grey areas 110, 112 of the unfiltered EV image 100 of FIG. 1. An IR camera records heat emissions from objects as an intensity level. An intensity level threshold is determined below which emissions are filtered from the EV image. By merging the EV image over the SV image with only the higher intensity emitting objects of the EV image remaining, objects or terrain in the SV image may be viewed through the EV image.

Figure 7:
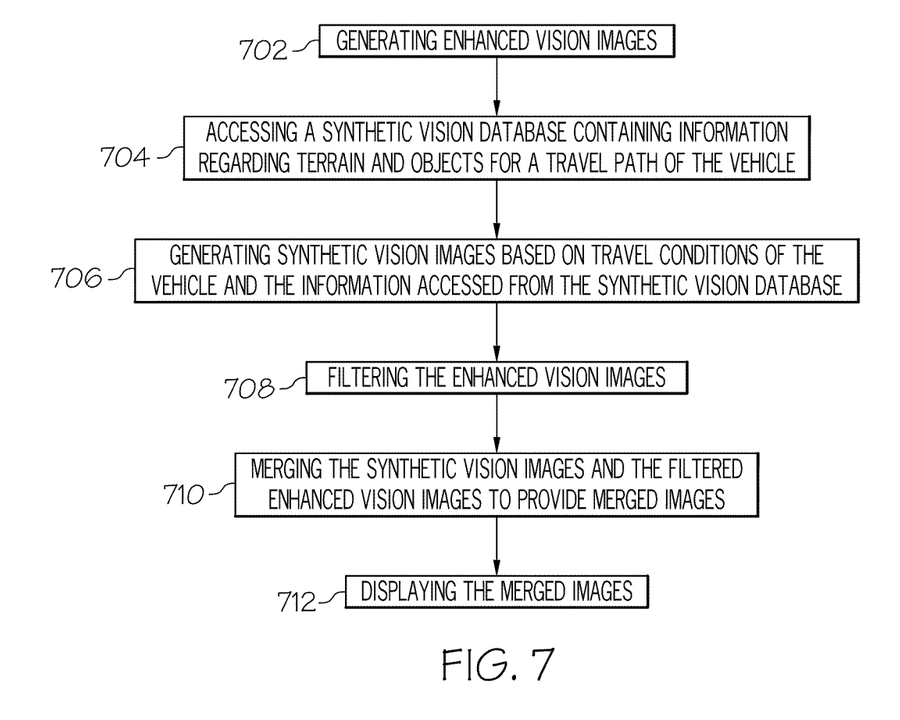
FIG. 7 is a flow diagram of a method for generating a merged image of an SV image and a filtered EV image, in accordance with an exemplary embodiment.

FIG. 7 is a flow diagram of a method of operating the vehicle display system 400 in accordance with an exemplary embodiment. In an exemplary embodiment, the EV system 408 generates EV images, step 702, in response to data supplied by the enhanced image sensor. The generation of EV images 702 comprises, for example, the generation of infrared images or millimeter-wave images. In the same timeframe, an SV database containing information regarding terrain and objects for a travel path of the vehicle are accessed, step 704. SV images are generated, step 706, based on the information accessed from the SV database, and travel conditions provided by the flight management system 406. Travel conditions provided by the flight management system 406 may include information such as aircraft position, heading, attitude, flight plan information of the vehicle, and flight information such as present altitude, speed, pitch, roll, and position.

The EV images are filtered, step 708, by the filter 412. Alternatively, in lieu of the filter 412, the filtering process, step 708, may be performed within the processor 414. The sensor 410, for example an IR camera, records the objects (buildings, runway, terrain) at different intensities bases on the temperature of the object. The terrain typically will have a much lower temperature than other objects and would be displayed as black or a dark gray. By filtering, step 708, the lower intensity portions 110, 112 of the EV image 100, the image provided by the SV system 402 will be viewable when merged, step 710. The threshold below which the data within the EV image are filtered may be predetermined or set by the aircrew during flight.

The SV images and the filtered EV images are then merged, step 710, to provide filtered merged images for display, step 712.

In another exemplary embodiment, the SV and EV images are displayed in different formats, enabling the operator viewing the displayed images to distinguish between the two images. The two formats may be represented, for example, by different colors. In other embodiments, the different formats may include, for example, different brightness.

It has been shown that filtering an EV image by removing portions having a weaker signal, e.g., black and dark gray, and merging the filtered EV image with an SV image results in a merged image that be viewed more clearly than previously known merged images. This merged image including the filtered EV image is easy to interpret and differentiates between the SV image and the EV image.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter, it being understood that various changes may be made in the function and arrangement of elements described in an exemplary embodiment without departing from the scope of the inventive subject matter as set forth in the appended claims.

What is claimed is:

1. A display system for displaying enhanced vision images and captured images, comprising:
    an enhanced vision system configured for generating the enhanced vision images;
    an electronic vision system configured for generating the captured images;
    a processor configured to filter the enhanced vision images, consisting of removing areas having an undesired intensity, to produce filtered enhanced vision images and merge the filtered enhanced vision images and the captured images to provide filtered merged images as a single video image; and
    a display configured to display the filtered merged images.

2. The display system of claim 1 wherein the electronic vision system comprises a camera and the captured images comprise video images.

3. The display system of claim 1 wherein the electronic vision system comprises a synthetic vision system and the captured images comprise synthetic vision images.

4. The display system of claim 3, further comprising a synthetic vision database providing data to the synthetic vision system.

5. The display system of claim 4, wherein the synthetic vision images comprises a first format and the enhanced vision images comprises a second format.

6. The display system of claim 4, wherein the synthetic vision images comprises a first color and the enhanced vision images comprises a second color.

7. The display system of claim 4, wherein:
    the display system is disposed within an aircraft,
    the display system further comprises a flight management system for providing flight positioning information, and
    the synthetic vision system generates the synthetic vision images based on the flight positioning information from the flight management system.

8. The display system of claim 1 wherein the processor filters portions of the enhanced vision images that satisfy a threshold.

9. The display system of claim 8 wherein the display system is disposed within an aircraft and the threshold is selected by an operator of the aircraft.

10. The display system of claim 8 wherein the threshold is defined by an intensity level.

11. The display system of claim 8 wherein the threshold is defined by a frequency.

12. An aircraft display system for displaying enhanced vision and synthetic vision images to an aircrew member of an aircraft, comprising:
    an enhanced vision system configured for generating enhanced vision images;
    a synthetic vision database containing information regarding terrain for a flight path of the aircraft;
    a synthetic vision system configured to obtain information from the synthetic vision database for generating synthetic vision images based on flight conditions of the aircraft;
    a processor configured to filter the enhanced vision image by removing areas of undesired intensity to produce a filtered enhanced vision image and merge the filtered enhanced vision image and the synthetic vision image for providing a filtered merged image; and
    a display configured to display the filtered merged image.

13. The aircraft display system of claim 11, wherein the enhanced vision image sensor is an infrared video camera.

14. The aircraft display system of claim 11, wherein the enhanced vision image sensor is a millimeter-wave video camera.

15. The aircraft display system of claim 11, wherein the synthetic vision database comprises a flight management system configured to provide the flight conditions for the aircraft.

16. The aircraft display system of claim 11 wherein the processor filters portions of the enhanced vision images having an intensity that does not satisfy a threshold.

17. A method for displaying enhanced vision images and captured images to an operator of a vehicle, comprising:
   generating enhanced vision images;
   generating captured images;
   filtering the enhanced vision images by removing areas of low light intensity to provide filtered enhanced vision images;
   merging the captured images and the filtered enhanced vision images to provide merged images as a video image; and
   displaying the merged images.

18. The method of claim 17 further comprising accessing a synthetic vision database containing information regarding terrain for a travel path of the vehicle and wherein the generating captured images comprises generating synthetic vision images based on travel conditions of the vehicle and the information accessed from the synthetic vision database.

19. The method of claim 18, wherein generating enhanced vision images comprises generating enhanced vision images in a first format, and the generating synthetic vision images comprises generating synthetic vision images in a second format.

20. The method of claim 18, wherein the filtering step comprises filtering portions of the enhanced vision image below an intensity threshold.

\* \* \* \* \*